(12) United States Patent
Schuh et al.

(10) Patent No.: US 12,067,253 B2
(45) Date of Patent: Aug. 20, 2024

(54) OPPORTUNISTIC BACKGROUND DATA INTEGRITY SCANS

(71) Applicant: Micron Technology, Inc., Boise, ID (US)

(72) Inventors: Karl D. Schuh, Santa Cruz, CA (US); William Richard Akin, Morgan Hill, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 15 days.

(21) Appl. No.: 17/666,087

(22) Filed: Feb. 7, 2022

(65) Prior Publication Data

US 2023/0251779 A1  Aug. 10, 2023

(51) Int. Cl.
*G06F 12/00* (2006.01)
*G06F 3/06* (2006.01)

(52) U.S. Cl.
CPC .......... *G06F 3/0619* (2013.01); *G06F 3/0604* (2013.01); *G06F 3/0659* (2013.01); *G06F 3/0679* (2013.01)

(58) Field of Classification Search
CPC .... G06F 3/0619; G06F 3/0604; G06F 3/0659; G06F 3/0679

USPC ......................................................... 711/154
See application file for complete search history.

(56) References Cited

U.S. PATENT DOCUMENTS

| | | | | |
|---|---|---|---|---|
| 2002/0097670 A1* | 7/2002 | Struhsaker | .......... | H04W 88/021 370/210 |
| 2008/0242426 A1* | 10/2008 | Kraft | ....................... | G07F 17/32 463/43 |
| 2017/0071056 A1* | 3/2017 | Stoev | ....................... | G11C 7/04 |

FOREIGN PATENT DOCUMENTS

WO    WO2017044339    *  3/2017

\* cited by examiner

*Primary Examiner* — Mardochee Chery
(74) *Attorney, Agent, or Firm* — NICHOLSON DE VOS WEBSTER & ELLIOTT LLP

(57) ABSTRACT

Exemplary methods, apparatuses, and systems include determining that a memory component to be subjected to a background data integrity scan does not currently satisfy an activity threshold. The background data integrity scan is delayed in response to determining memory component does not satisfy the activity threshold. In response to detecting a background data integrity scan trigger event, the background data integrity scan is performed.

20 Claims, 5 Drawing Sheets

OPPORTUNISTIC BACKGROUND DATA INTEGRITY SCANS

TECHNICAL FIELD

The present disclosure generally relates to the mitigation of data errors in a memory subsystem, and more specifically, relates to performing background data integrity scans on an opportunistic basis.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
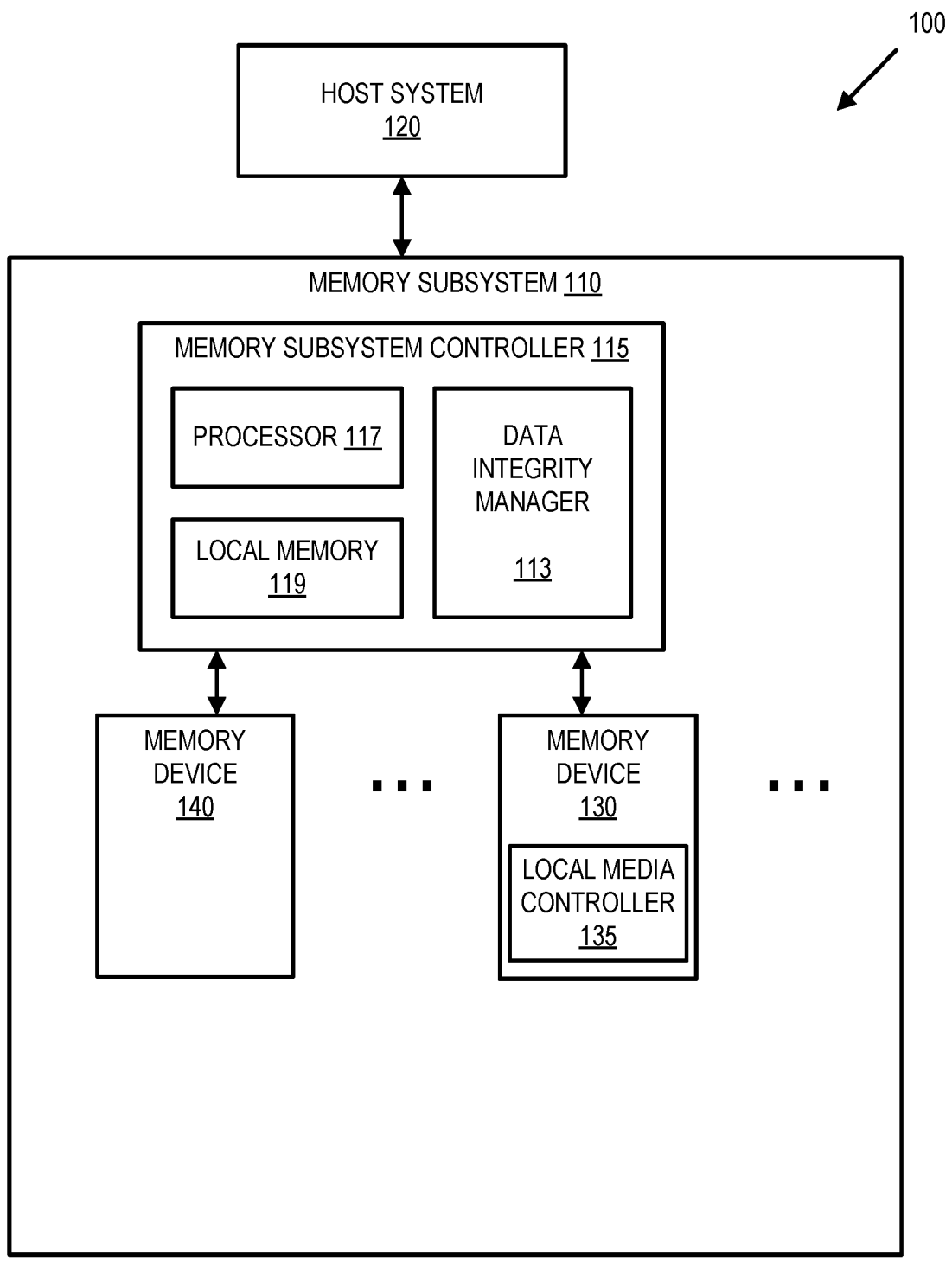
FIG. 1 illustrates an example computing system that includes a memory subsystem in accordance with some embodiments of the present disclosure.

Aspects of the present disclosure are directed to performing background data integrity scans on an opportunistic basis in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN).

For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

Data reliability in a memory can degrade as the memory device increases in density (e.g., device components scale down in size, when multiple bits are programmed per cell, etc.). One contributor to this reduction in reliability is read disturb. Read disturb occurs when a read operation performed on one portion of the memory (e.g., a row of cells), often referred to as the aggressor, impacts the threshold voltages in another portion of memory (e.g., a neighboring row of cells), often referred to as the victim. Memory devices typically have a finite tolerance for these disturbances. For example, a threshold number of read operations performed on aggressor cells can change the victim cells to different logical states than originally programmed, which results in errors. Additionally, data reliability can degrade due to other contributing factors, such as when the memory approaches end-of-life (e.g., in terms of program/erase (P/E) cycles).

Background data integrity scans help a memory subsystem mitigate errors due to read disturb and other data reliability issues. For example, a memory subsystem can use background data integrity scans to read data from memory, apply an error correction scheme, and rewrite the corrected data to memory when an error threshold is satisfied. Additionally, the memory subsystem can use background data integrity scans to detect and track the degradation of memory locations. In order to provide data reliability across a memory subsystem, background data integrity scans are scheduled to scan at a fixed frequency. Such a fixed schedule of background data integrity scans, however, can result in collisions between background data integrity scans and requests from a host system to read or write data. These collisions can significantly delay the completion of the host request(s). These delays are further amplified when, e.g., requests for online services are managed by multiple servers and the slowest server limits the throughput for the rest of the servers in order to maintain a consistent response time for quality of service (QoS) requirements.

Aspects of the present disclosure address the above and other deficiencies by performing background data integrity scans on an opportunistic basis. A scan window gives the memory subsystem flexibility to attempt to perform a background data integrity scan when activity directed to a memory component (e.g., read or write requests) satisfies a threshold (e.g., below a threshold level of activity or otherwise during idle time of a given period). If the activity directed to a memory component does not satisfy the threshold during the scan window, the memory subsystem proceeds with the background data integrity scan despite collisions. As a result, the memory subsystem can perform background data integrity scans within a minimum amount of time while reducing collisions. Additionally, performing background data integrity scans on an opportunistic basis results in improved QoS that might otherwise require expensive improvements in memory manufacturing and/or tuning to achieve.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM)

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a data integrity manager 113 that can perform background data integrity scans on an opportunistic basis. In some embodiments, the controller 115 includes at least a portion of data integrity manager 113. For example, the controller 115 can include a processor 117 (processing device) configured to execute instructions stored in local memory 119 for performing the operations described herein. In some embodiments, a data integrity manager 113 is part of the host system 120, an application, or an operating system.

The data integrity manager 113 performs background data integrity scans on an opportunistic basis by using scan windows. A scan window gives the data integrity manager 113 flexibility to attempt to perform a background data integrity scan during idle time of a given period. If a memory component is not idle during a scan window, the end of a scan window or similar threshold triggers the background data integrity scan. Further details with regards to the operations of the data integrity manager 113 are described below.

Figure 2:
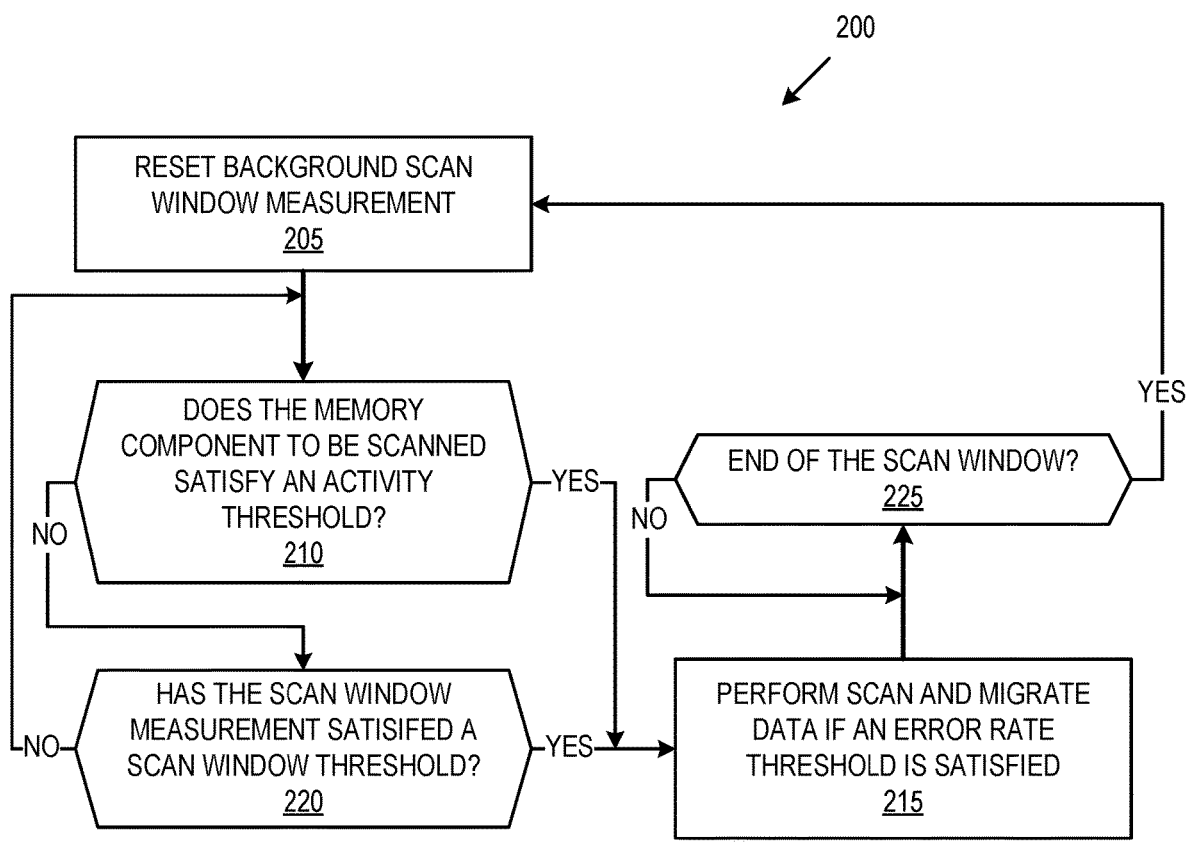
FIG. 2 is a flow diagram of an example method to perform background data integrity scans on an opportunistic basis in accordance with some embodiments of the present disclosure.

FIG. 2 is a flow diagram of an example method 200 to perform background data integrity scans on an opportunistic basis in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the data integrity manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing device resets a background scan window measurement. For example, the data integrity manager 113 can measure a scan window using time and reset a timer or other tracking of time for each current scan window. In one embodiment, the time for each scan window is a fixed value. In another embodiment, the time for each scan window is a dynamic value that can be adjusted over time. For example, the scan window time can decrease as the memory component ages in terms of time, P/E cycles, reduced data reliability, etc. Alternatively, the data integrity manager 113 can measure background scan windows in P/E cycles and reset a count of P/E cycles for each scan window.

In one embodiment, the processing device maintains a background scan window measurement for each memory component. For example, the data integrity manager 113 manages a scan window per memory die or other subdivision of memory (referred to as a "memory component" below for simplicity of explanation).

At operation 210, the processing device determines if a memory component to be scanned is currently idle or otherwise satisfies an activity threshold. For example, the data integrity manager 113 can detect whether or not the memory controller 115 is currently queuing or otherwise processing read or write requests from the host system 120 that are directed to a memory component using addresses from the requests. If the memory controller 115 is not processing read or write requests directed to the memory component to be the subject of a background data integrity scan, the data integrity manager 113 determines the memory component to be idle and the method 200 proceeds to operation 215. Alternatively, if the memory controller 115 is processing read or write requests that satisfy (e.g., meet or do not exceed) a threshold number of requests directed to the memory component, a threshold amount of power or other resources, etc., the data integrity manager 113 determines the memory component satisfies the activity threshold and the method 200 proceeds to operation 215. If the memory controller 115 is processing a number of read or write request directed to the memory component that do not satisfy the activity threshold, the data integrity manager 113 determines the memory component to not be idle/fails to satisfy the activity threshold and the method 200 proceeds to operation 220.

At operation 215, the processing device performs one or more background data integrity scans of the memory component. For example, the data integrity manager 113 executes a read of one or more portions of the memory component to check the error rate or other indicator of data reliability. If the error rate satisfies an error threshold, the data integrity manager 113 can correct the data (e.g., using ECC) and write the corrected data back to memory (e.g., to a different memory location).

At operation 220, the processing device determines if the scan window measurement has satisfied a scan window threshold. For example, the data integrity manager 113 determines if the timer or other background scan window measurement has reached the end of the scan window, a threshold percentage (e.g., 90% of the scan window), or another threshold value that indicates that the data integrity manager 113 should no longer wait for idle time or for the memory component to otherwise satisfy the activity threshold within the current scan window. If the processing device determines that the scan window measurement has satisfied the scan window threshold, the method 200 proceeds to operation 215 to perform a background data integrity scan as described above. If the processing device determines that the scan window measurement has not satisfied the scan window threshold, the method 200 returns to operation 210 delays the background data integrity scan and continues waiting for the memory component to have an idle period or otherwise satisfy the activity threshold.

At operation 225, the processing device optionally determines if the end of a scan window has been reached. For example, the data integrity manager 113 determines if the timer or other background scan window measurement has reached the end of the scan window before proceeding to the management of the next background data integrity scan. If the processing device determines that the end of the current scan window has been reached, the method 200 returns to operation 205 for the next scan window. If the processing device determines that the end of the current scan window has not been reached, the method 200 returns to operation 225 to await the end of the current scan window. In another embodiment, if the processing device determines that the end of the current scan window has not been reached, the method 200 returns to operation 210 to evaluate if another background data integrity scan can be performed during the current scan window. In yet another embodiment, the method 200 proceeds from operation 215 to operation 205 to start the next scan window and evaluate if a background data integrity scan can be performed during an idle period of the next scan window or otherwise while the memory component satisfies the activity threshold.

Figure 3:
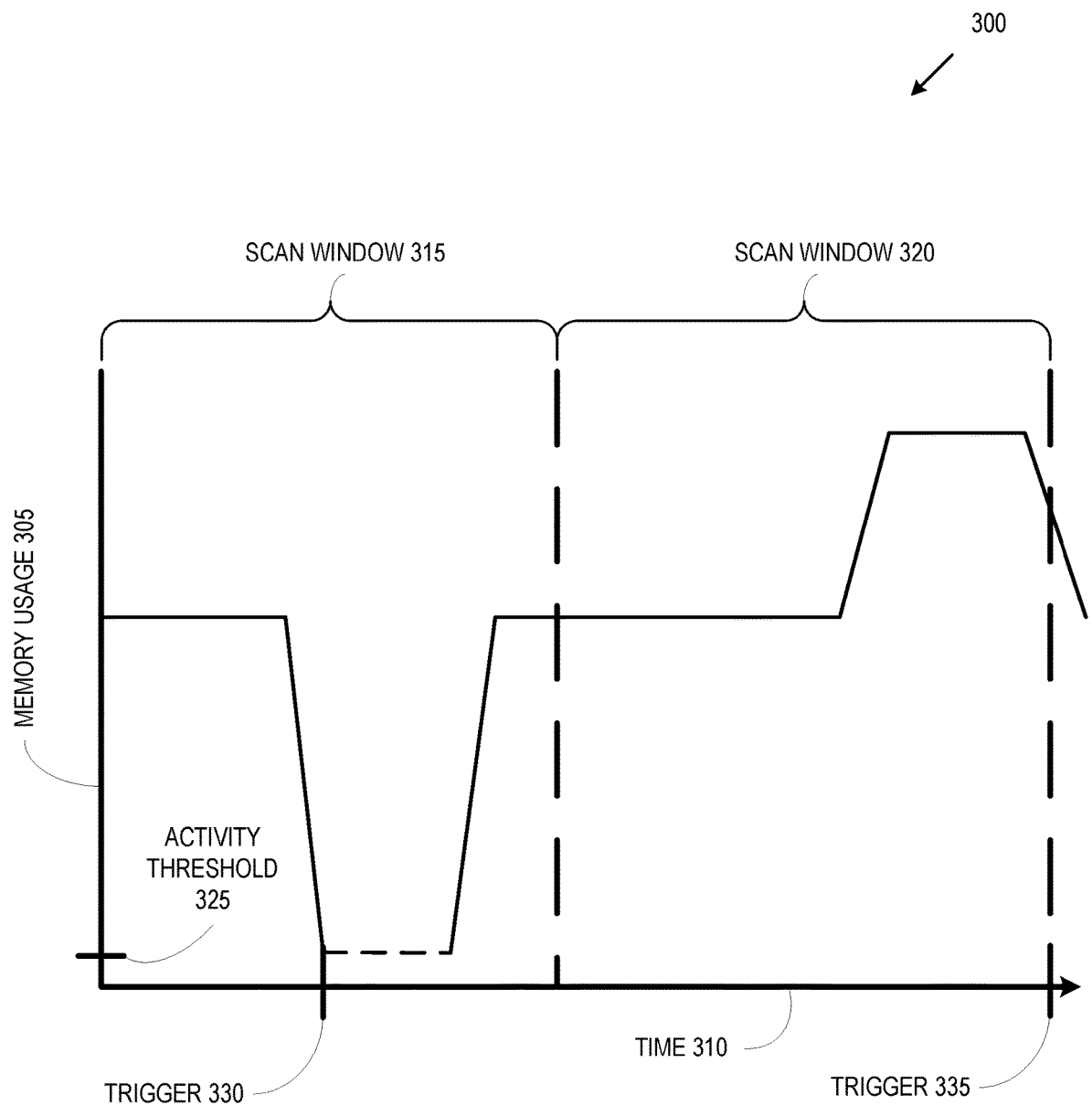
FIG. 3 illustrates example opportunistic background integrity scan windows and triggers in accordance with some embodiments of the present disclosure.

FIG. 3 illustrates a graph 300 of example opportunistic background integrity scan windows and triggers in accordance with some embodiments of the present disclosure. The graph 300 plots an example of memory usage 305 of a memory component over time 310. The illustrated amount of time 310 is divided into two scan windows, scan window 315 and scan window 320. During each scan window, the data integrity manager 113 detects a trigger for executing a background data integrity scan. For example, as described with reference to the method 200 above, the data integrity manager 113 detects idle time or an activity level that otherwise satisfies (e.g., meets or falls below) an activity threshold 325 in scan window 315 as a trigger 330 to perform a background data integrity scan. As another example, and as described with reference to the method 200 above, the data integrity manager 113 detects the end of scan window 320 without idle time or, otherwise, an activity level that satisfies the activity threshold 325, during the window as a trigger 335 to perform a background data integrity scan.

Figure 4:
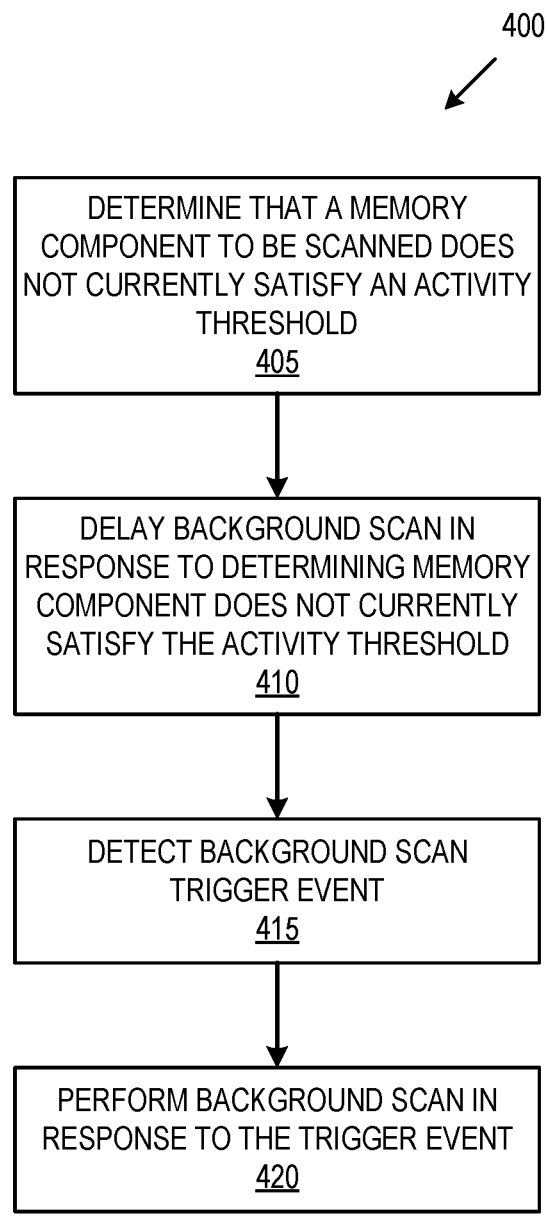
FIG. 4 is a flow diagram of another example method to perform background data integrity scans on an opportunistic basis in accordance with some embodiments of the present disclosure.

FIG. 4 is a flow diagram of another example method 400 to perform background data integrity scans on an opportunistic basis in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the data integrity manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device determines that a memory component to be the subject of a background data integrity scan does not currently satisfy an activity threshold. In one embodiment, satisfying the activity threshold includes the memory component being in an idle state. For example, the data integrity manager 113 detects whether the memory controller 115 is currently queuing or otherwise processing read or write requests from the host system 120 that are directed to a memory component using addresses from the request(s) as described above with reference to operation 210. In another embodiment, the data integrity manager 113 detects a number of read or write requests being queued for or processed by the memory component, an activity value that corresponds to read or write requests being queued for or processed by the memory component (e.g., in terms of consumption of power or another resource), or another representation of the activity level of the memory component.

At operation 410, the processing device delays the background data integrity scan for the memory component in response to determining the memory component does not satisfy the activity threshold. For example, the data integrity manager 113 monitors for a trigger, such as an idle period, activity level at or below a threshold level, or scan window threshold, for executing a background data integrity scan as described above with reference to operations 210 and 220.

At operation 415, the processing device detects a background data integrity scan trigger event. As described above with reference to operations 210 and 220 and graph 300, the data integrity manager 113 detects idle time in a scan window or a scan window threshold (e.g., the end of the window) as a trigger to perform a background data integrity scan.

At operation 420, the processing device performs a background data integrity scan in response to the trigger event. For example, the data integrity manager 113 executes a read of one or more portions of the memory component to check the error rate or other indicator of data reliability as described above with reference to operation 215.

Figure 5:
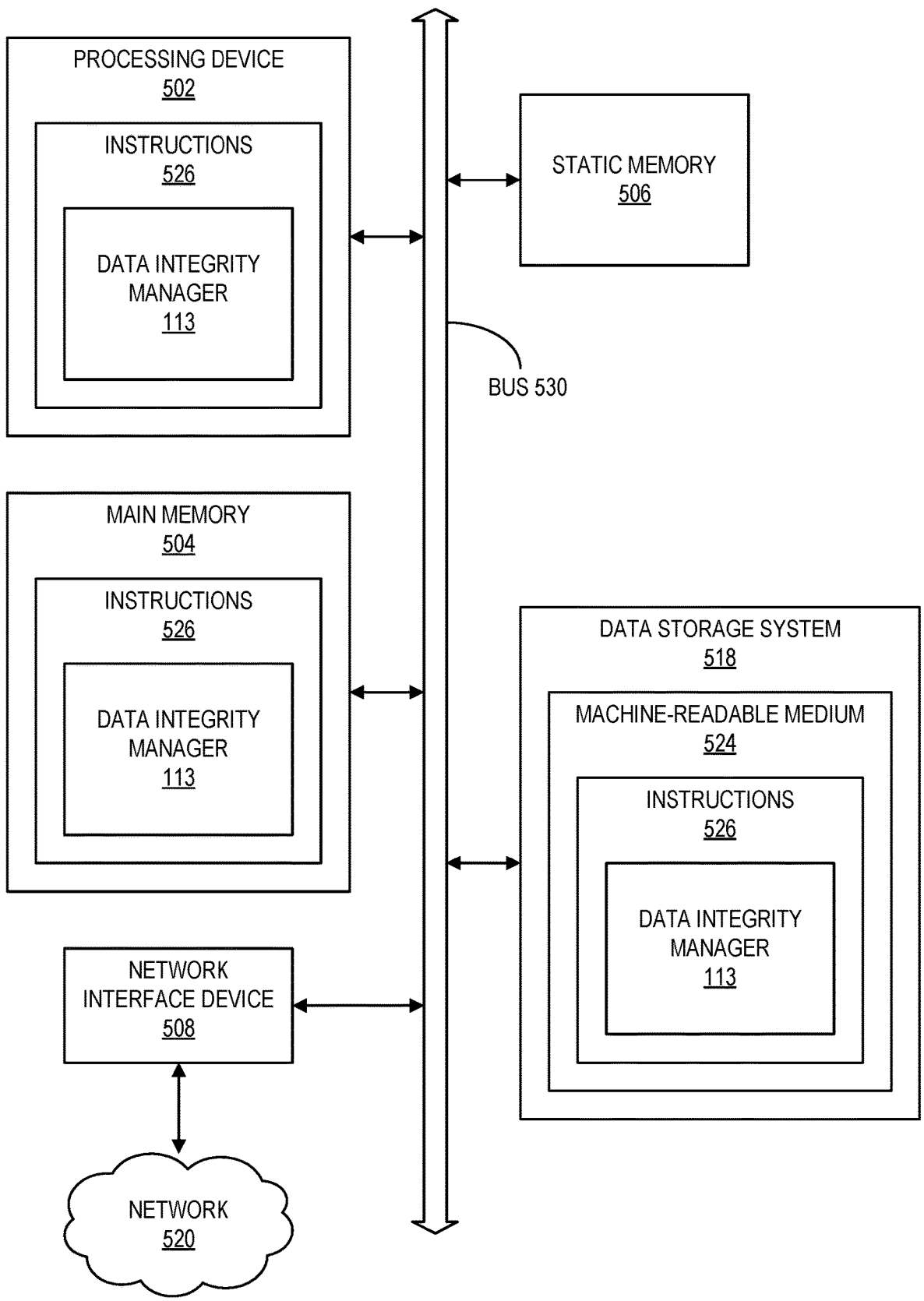
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the data integrity manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory subsystem 110 of FIG. 1.

In one embodiment, the instructions 526 include instructions to implement functionality corresponding to a data integrity manager (e.g., the data integrity manager 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 and 400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   determining, using a memory request queue, that a memory component to be subjected to a background data integrity scan does not currently satisfy an activity threshold;
   delaying the background data integrity scan in response to determining the memory component does not satisfy the activity threshold;
   detecting a background data integrity scan trigger event; and
   performing the background data integrity scan in response to trigger event.

2. The method of claim 1, wherein the trigger event is a determination that the memory component satisfies the activity threshold.

3. The method of claim 1, further comprising:
   resetting a background scan window measurement in response to performing the background data integrity scan.

4. The method of claim 1, wherein the trigger event is a determination that a scan window measurement satisfies a scan window threshold.

5. The method of claim 4, further comprising:
   resetting a background scan window timer, wherein the scan window threshold is an amount of time elapsed following the resetting of the background scan window timer.

6. The method of claim 4, further comprising:
   resetting a background scan window measurement, wherein the scan window threshold is an amount of memory operations performed following the resetting of the background scan window measurement.

7. The method of claim 1, further comprising:
   detecting an end of a current background data integrity scan window; and
   resetting a background scan window measurement in response to detecting the end of a current background data integrity scan window.

8. A non-transitory computer-readable storage medium comprising instructions that, when executed by a processing device, cause the processing device to:
   determine, using a memory request queue, that a memory component to be subjected to a background data integrity scan does not currently satisfy an activity threshold;
   delay the background data integrity scan in response to determining the memory component does not satisfy the activity threshold;
   detect a background data integrity scan trigger event; and
   perform the background data integrity scan in response to trigger event.

9. The non-transitory computer-readable storage medium of claim 8, wherein the trigger event is a determination that the memory component satisfies the activity threshold.

10. The non-transitory computer-readable storage medium of claim 8, wherein the processing device is further to:
    reset a background scan window measurement in response to performing the background data integrity scan.

11. The non-transitory computer-readable storage medium of claim 8, wherein the trigger event is a determination that a scan window measurement satisfies a scan window threshold.

12. The non-transitory computer-readable storage medium of claim 11, wherein the processing device is further to:
    reset a background scan window timer, wherein the scan window threshold is an amount of time elapsed following the resetting of the background scan window timer.

13. The non-transitory computer-readable storage medium of claim 12, wherein the processing device is further to:
    reset a background scan window measurement, wherein the scan window threshold is an amount of memory operations performed following the resetting of the background scan window measurement.

14. The non-transitory computer-readable storage medium of claim 8, wherein the processing device is further to:
    detect an end of a current background data integrity scan window; and
    reset a background scan window measurement in response to detecting the end of a current background data integrity scan window.

15. A system comprising:
    a plurality of memory devices; and
    a processing device, operatively coupled with the plurality of memory devices, to:
       determine, using a memory request queue, that a memory component to be subjected to a background data integrity scan does not currently satisfy an activity threshold;
       delay the background data integrity scan in response to determining the memory component does not satisfy the activity threshold;
       detect a background data integrity scan trigger event, wherein the trigger event is a determination that the memory component satisfies the activity threshold or a determination that a scan window measurement satisfies a scan window threshold; and
       perform the background data integrity scan in response to trigger event.

16. The system of claim 15, wherein the processing device is further to:

reset a background scan window measurement in response to performing the background data integrity scan.

17. The system of claim 15, wherein the determination that the scan window measurement has satisfied the scan window threshold is a detection of an end of a current background data integrity scan window.

18. The system of claim 15, wherein the processing device is further to:
reset a background scan window timer, wherein the scan window threshold is an amount of time elapsed following the resetting of the background scan window timer.

19. The system of claim 15, wherein the processing device is further to:
reset a background scan window measurement, wherein the scan window threshold is an amount of memory operations performed following the resetting of the background scan window measurement.

20. The system of claim 15, wherein the processing device is further to:
detect an end of a current background data integrity scan window; and
reset a background scan window measurement in response to detecting the end of a current background data integrity scan window.

* * * * *